US 6,605,003 B2

(12) United States Patent
Suchocki et al.

(10) Patent No.: US 6,605,003 B2
(45) Date of Patent: Aug. 12, 2003

(54) GAME ROTATION SYSTEM FOR MULTIPLE GAME AMUSEMENT GAME SYSTEMS

(75) Inventors: Edward J. Suchocki, Buffalo Grove, IL (US); Vince Drew Dickinson, Chicago, IL (US)

(73) Assignee: Midway Amusement Games LLC, Chicago, IL (US)

(*) Notice: Subject to any disclaimer, the term of this patent is extended or adjusted under 35 U.S.C. 154(b) by 0 days.

(21) Appl. No.: 09/899,786

(22) Filed: Jul. 5, 2001

(65) Prior Publication Data

US 2003/0008708 A1 Jan. 9, 2003

(51) Int. Cl.[7] .................................. A63F 13/10
(52) U.S. Cl. ........................... 463/29; 463/20
(58) Field of Search .................. 463/1, 6, 7, 8, 463/9, 16–20, 29, 40–42; 273/143 R

(56) References Cited

U.S. PATENT DOCUMENTS

| | | | |
|---|---|---|---|
| 3,221,260 A | 11/1965 | Henrion | |
| 3,351,929 A | 11/1967 | Wagner | |
| 3,569,617 A | 3/1971 | Allen et al. | |
| 3,602,702 A | 8/1971 | Warnock | |
| 3,778,810 A | 12/1973 | Hayashi | |
| 3,786,479 A | 1/1974 | Brown et al. | |
| 4,016,362 A | 4/1977 | Bristow et al. | |
| 4,034,990 A | 7/1977 | Baer | |
| 4,072,930 A | 2/1978 | Lucero et al. | |
| 4,126,851 A | 11/1978 | Okor | |
| 4,127,849 A | 11/1978 | Okor | |
| 4,174,517 A | 11/1979 | Mandel | |
| 4,335,809 A | 6/1982 | Wain | |
| 4,372,558 A | 2/1983 | Shimamoto et al. | |
| 4,521,014 A | 6/1985 | Sitrick | |
| 4,564,923 A | 1/1986 | Nakano | |
| 4,570,930 A | 2/1986 | Matheson | |
| 4,572,509 A | 2/1986 | Sitrick | |
| 5,083,271 A | 1/1992 | Thacher et al. | |
| 5,257,179 A | 10/1993 | DeMar | |
| 5,292,125 A | 3/1994 | Hochstein et al. | |
| 5,350,176 A | 9/1994 | Hochstein et al. | |
| 5,533,727 A | 7/1996 | DeMar | |
| 5,575,717 A | * 11/1996 | Houriet et al. | 273/148 B |
| 5,674,128 A | 10/1997 | Holch et al. | |
| 5,685,775 A | 11/1997 | Bakoglu et al. | |
| 5,702,305 A | 12/1997 | Norman et al. | |
| 5,720,663 A | 2/1998 | Nakatani et al. | |
| 5,935,004 A | * 8/1999 | Tarr et al. | 463/40 |
| 6,004,211 A | * 12/1999 | Brenner et al. | 463/25 |
| 6,280,328 B1 | * 8/2001 | Holch et al. | 463/18 |
| 6,402,618 B1 | * 6/2002 | Reed et al. | 463/25 |

FOREIGN PATENT DOCUMENTS

GB   2 262 642   6/1993

OTHER PUBLICATIONS

Operator's Manual (Countertop & Upright Models); *Concorde 2*, JVL Enterprises Ltd., Dec. 1997, 19 pgs.

* cited by examiner

*Primary Examiner*—Gene Mancene
*Assistant Examiner*—Patrick Buechner
(74) *Attorney, Agent, or Firm*—Jenkens & Gilchrist

(57) ABSTRACT

A multiple game amusement game system comprises a memory for storing a plurality of amusement games, a display for depicting a game selection menu including a set of game titles associated with certain ones of the plurality of amusement games, and a processing unit for rotating game titles into and out of the depicted set of game titles based on predetermined criteria.

20 Claims, 5 Drawing Sheets

FIG. 3

| Name | Plays | Time |
|---|---|---|
| | 54 | 56 |
| | 50 | |
| 11. Go Wild | 0 | 0:00 |
| 12. Hot Hoops (OUT) | 0 | 0:00 |
| 13. Jelly Bean Game (OFF) | 0 | 0:00 |
| 14. Lines of Sight (OUT) | 0 | 0:00 |
| 15. Mah Jongg Pairs | 0 | 0:00 |
| 16. Mahki (OUT) | 0 | 0:00 |
| 17. Midway Lanes (OFF) | 0 | 0:00 |
| 18. Movie Trivia | 0 | 0:00 |
| 19. Pairs | 0 | 0:00 |
| 20. Pick Up 6 (OUT) | 0 | 0:00 |

PgUp

PgDown

Clear All   Next   OK

52

GAME ROTATION SYSTEM FOR MULTIPLE GAME AMUSEMENT GAME SYSTEMS

FIELD OF THE INVENTION

The present invention relates generally to the field of amusement game systems and, more particularly, to a multiple game rotation system for an amusement game machine.

BACKGROUND OF THE INVENTION

Traditionally, amusement gaming machines such as those found in arcades and other social establishments have been limited in scope to providing a single type of amusement game per game machine unit. Spatial concerns limited the number of "upright" game machines at a particular location due to the size of "upright" game machines. Floor space is at a premium at many gaming locations including bars, restaurants, and arcades.

More recently, due in part to technological advancements in the computer industry, amusement game machines having multiple games per machine have been introduced. Such machines allow a game player to choose among a plurality of amusement games which the machine is capable of playing. These machines have mitigated some of the spatial concerns surrounding single game amusement game machines.

As strides continue to be made in the computer industry, multi-game amusement game machines are containing more titles than ever. For example, many multi-game amusement game machines contain over 50 titles per machine. One drawback of having so many game titles listed on a display of an amusement game machine is that a game player often finds it difficult to locate a particular game. The display screen becomes littered with game titles which often cause players to become confused, overwhelmed, and/or irritated. The inventors of the present invention have found that players will eventually walk away from multi-game amusement game machines having a display screen so cluttered that the screen is too difficult or too frustrating to navigate. Further, the inventors have observed more plays on multi-game amusement game machines having fewer titles and consequently a less cluttered display than machines with many more titles and, consequently, a more cluttered display.

Systems directed at alleviating the aforementioned cluttered display include limiting the number of titles displayed to the user as well as listing a specific number of games in a "top" or "favorites" category in addition to the less popular titles. However, either of these solutions requires manual operator intervention. Put another way, the operator must physically access an operator interface of the machine and select the game titles that are to be displayed to the user (or included in a "favorites" category). The inventors of the present invention have found that, in reality, the operators seldom take the time to update the listings or the "favorite" category. Rather, the same titles are continually displayed to the players of the multi-game amusement game machine. Therefore, a need exists for a multiple game amusement game system that automatically updates the games displayed to players of multi-game amusement game systems.

SUMMARY OF THE INVENTION

A multiple game amusement game system comprises a memory for storing a plurality of amusement games, a display for depicting a game selection menu including a set of game titles associated with certain ones of the plurality of amusement games, and a processing unit for rotating game titles into and out of the depicted set of game titles based on predetermined criteria.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

Other objects of the present invention will become apparent upon reading the following detailed description in conjunction with the drawings in which:

FIG. 3 is an game rotation operator audit screen according to one embodiment of the present invention;

DETAILED DESCRIPTION OF THE ILLUSTRATED EMBODIMENTS

Figure 1:
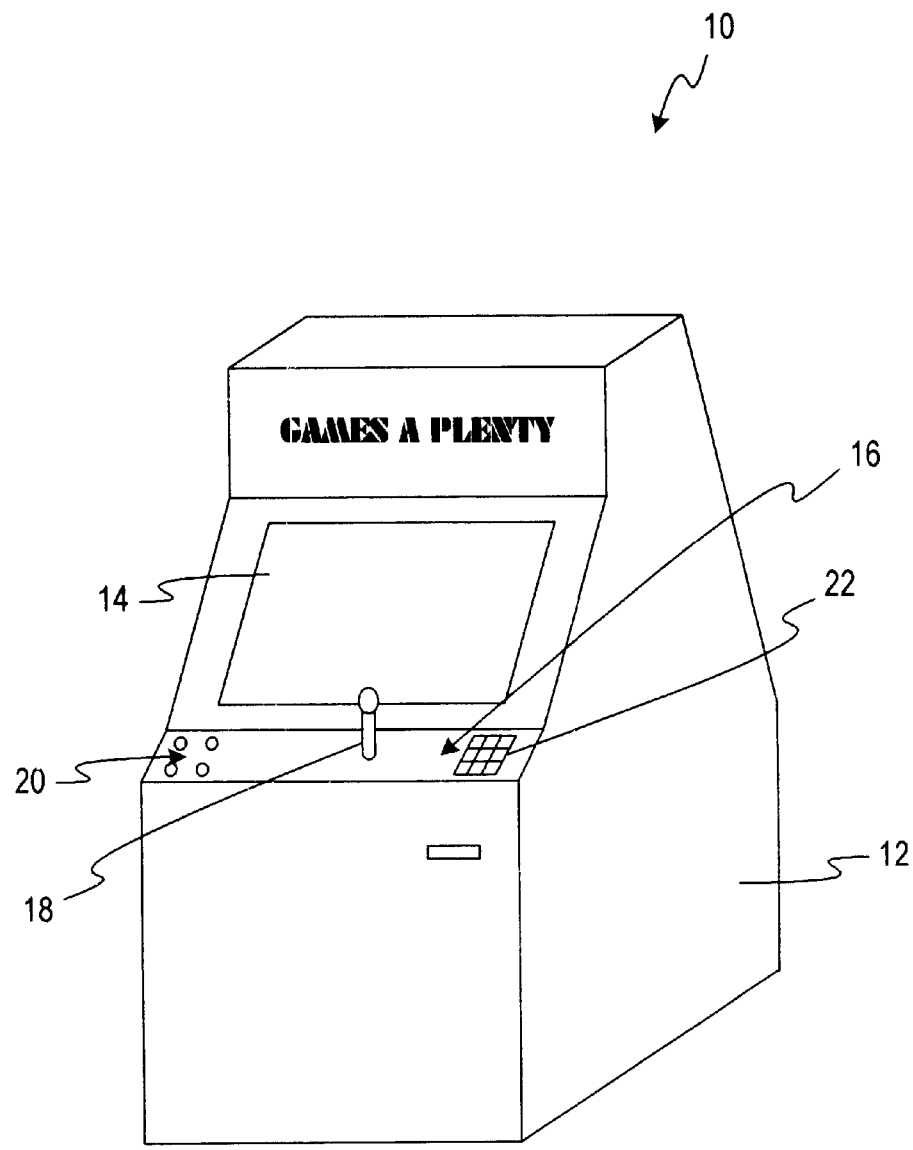
FIG. 1 is a perspective view of a multiple game amusement game machine for use with the present invention.

Referring now to the drawings and initially to FIG. 1, there is shown a multiple game amusement game machine ("multi-game machine") 10 for use with the present invention. The multi-game machine 10 includes a cabinet 12 for housing a display screen 14 and a control panel 16. The display 14 may incorporate a touch panel display in one embodiment of the present invention. The control panel incorporates controls necessary for a player to play the games of the multi-game system such as, for example, a joystick 18, buttons 20, and keypad 22. The machine 10 includes a processor such as a central processing unit (not shown) to control the operation of the machine 10.

The multi-game machine 10 is capable of running many different amusement games. The multi-game machine 10 has many (e.g., dozens) of game stored in a memory (not shown) located within the cabinet 12 of the machine 10. A player of the multi-game machine 10 can choose from a plurality of amusement games to play. Initially, before the commencement of game play, a player is presented with a game selection menu screen on the display 14. The game selection menu provides a listing of the amusement games titles from which the player can select. By manipulating the various controls on the control panel 16, the player can scroll though the game titles and select the particular game to be played. In an alternative embodiment of the machine 10, the display 14 is a touch panel display wherein the player selects games by depressing the touch screen adjacent the game title. Upon selection of a particular game listed on the display 16 by the player, the multi-game machine 10 initiates the execution of the selected amusement game.

In many prior art multi-game machines, the titles of each of the amusement games stored within a memory of the machine are displayed to the player of the machine. In other prior art machines, only a handful of games designated as "Top" or "Favorites" are displayed to a user. And in other prior art machines, games designated as "Top" or "Favorites" are displayed to the user in addition to the remaining games. Typically, an operator of the machine designates which games are to be listed as top games or favorite games. These designations can be manually changed by the operator at any time pursuant to an operator menu accessible to only the operator of the machine. As discussed in the background section, there are two drawbacks associated with these types of prior art multi-game machines. First, the listing of dozens of game titles on the machine's display can lead to a cluttered display and consequent frustration and/or confusion of the player. Second, where the game menu contains fewer games titles, these titles are, at most, infrequently updated. The present invention is directed at a game rotation system which limits the number of game options displayed to a player in a game selection menu of a machine such as the multi-game machine 10 shown in FIG. 1. The game rotation system of the present invention automatically updates the games displayed on game selection menu screen after a predetermined amount of time. In alternative embodiments of the present invention, the game rotation can be set scheduled on a daily, weekly, monthly, or bimonthly basis.

Figure 2:
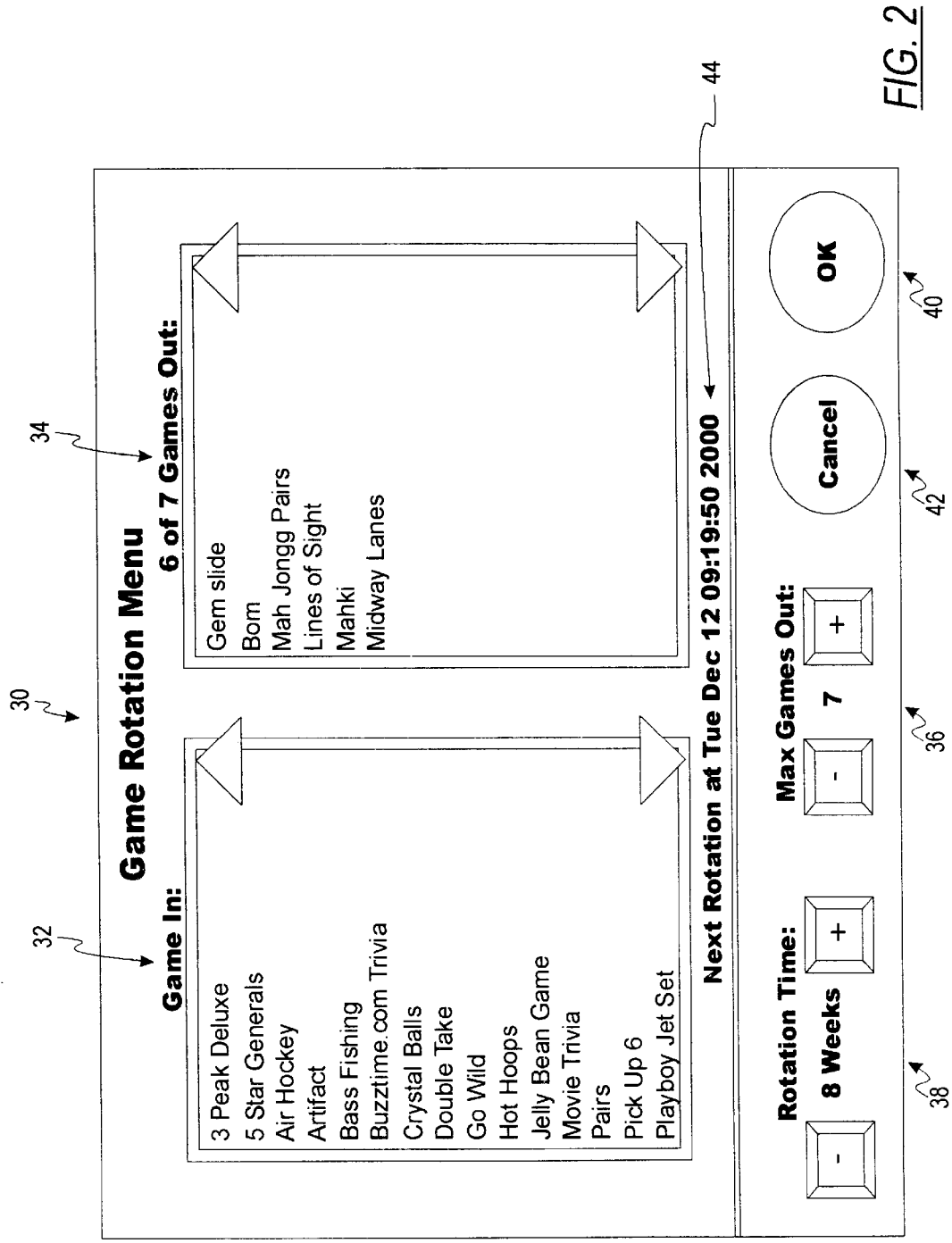
FIG. 2 is a game rotation set-up menu according to one embodiment of the present invention.
Figure 4:
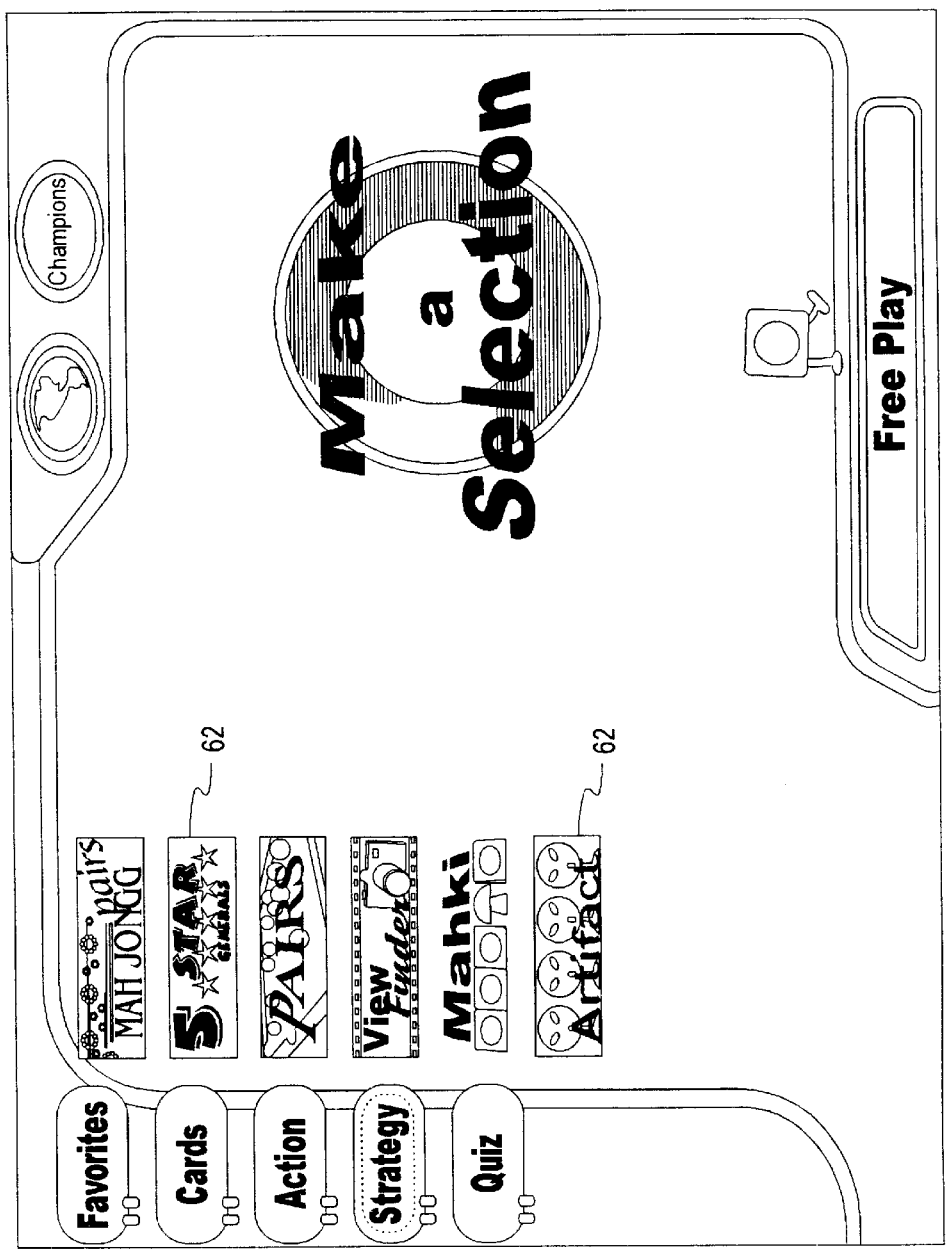
FIG. 4 is a player game menu according to one embodiment of the present invention.

Referring now to FIG. 2, a screen shot of an operator set-up menu 30 for the game rotation system is shown as it would appear when displayed on the display 14 of the multi-game machine 10. The set-up menu screen 30 includes a "games in" column 32 on the left-hand side of the menu screen 30 (as viewed in FIG. 2) and a "games out" column 34. Each of the columns 32, 34 has a plurality of game titles listed. The "games in" column 32 has listed therein each of the games which the operator has selected for rotation into a game selection menu 60 (FIG. 4). For example, in FIG. 2, the "games in" column 32 has "Bass Fishing" and "Hot Hoops" among other games titles selected for rotation into the game selection menu. The "games out" column 34 has listed therein each of the games which an operator has excluded from rotation into the game selection menu. For example, in FIG. 2, the "games out" column 34 has "Gem slide" and "Midway Lanes" among other games excluded from rotation into the game selection menu.

An operator may wish to exclude games from rotation into the player menu for a variety of reasons. For example, an excluded game may have been so unpopular that the operator deems it necessary to remove the game from rotation for re-introduction at a later time. In other situations, an operator may deem it necessary to periodically exclude more popular games from rotation into the game selection menu so that other less popular games will gain more exposure. The set-up menu 30 contains a "Max games out" selection element 36 which allows an operator to control the maximum number of game titles that can be moved to the "games out" column 34. In the set-up menu 30 illustrated in FIG. 2, the maximum number of games excluded from rotation to the game selection menu is set at seven games.

The game titles the operator has chosen for inclusion in the "games in" column 32 are earmarked for eventual rotation into the player game selection menu. The frequency for each game rotation operation can be set with the rotation time selection element 38. In FIG. 2, the rotation time has been set for eight weeks. Once the operator has placed game titles in the "games in" column 32 and the "games out" column 34 as well as set the game rotation frequency, the operator can either accept the settings with an "OK" button 40 of the set-up menu 30 or reject the settings with a "cancel" button 42 of the menu 30. If the operator decides to reject the settings, the game rotation system will return the previous setting. If the operator decides to accept the settings, the game rotation will take place as prescribed. The set-up menu 30 includes a status bar 44 to inform the operator when the next game rotation is scheduled.

Referring to FIG. 3, an operator audit screen 50 is shown according to one embodiment of the present invention. The audit screen 50 includes a first column 52 listing the titles of the games that the machine is capable of running, a second column 54 listing the number of plays corresponding to each game title, and a third column 56 for listing the time of game play associated with each game title. Games currently listed on the game selection screen are highlighted (e.g., "Go Wild," "Mah Jongg Pairs," "Movie Trivia," and "Paris"). An "Out" or "Off" flag is associated with each of the non-highlighted game titles to indicate whether a game is set for rotation into the game selection menu but not currently listed on the game selection menu or is taken out of the game rotation (e.g., placed in the "games out" column 34 of FIG. 2), respectively.

Referring now to FIG. 4, a game selection menu screen 60 for display on the display 14 of the machine is shown. As can be seen from FIG. 4, the game selection menu screen 60 has a limited number (e.g., five in FIG. 4) of titles 62 listed thereon so that the game selection menu appears uncluttered. The inventors of the present invention have found that a game selection menu having between two titles and ten titles displayed results in a game menu that appears uncluttered. The titles 62 of the amusement games available to the player of the game are aesthetically listed in the menu 60. Upon a quick inspection, a player can easily determine which games are currently available to play on the game machine 10.

Figure 5:
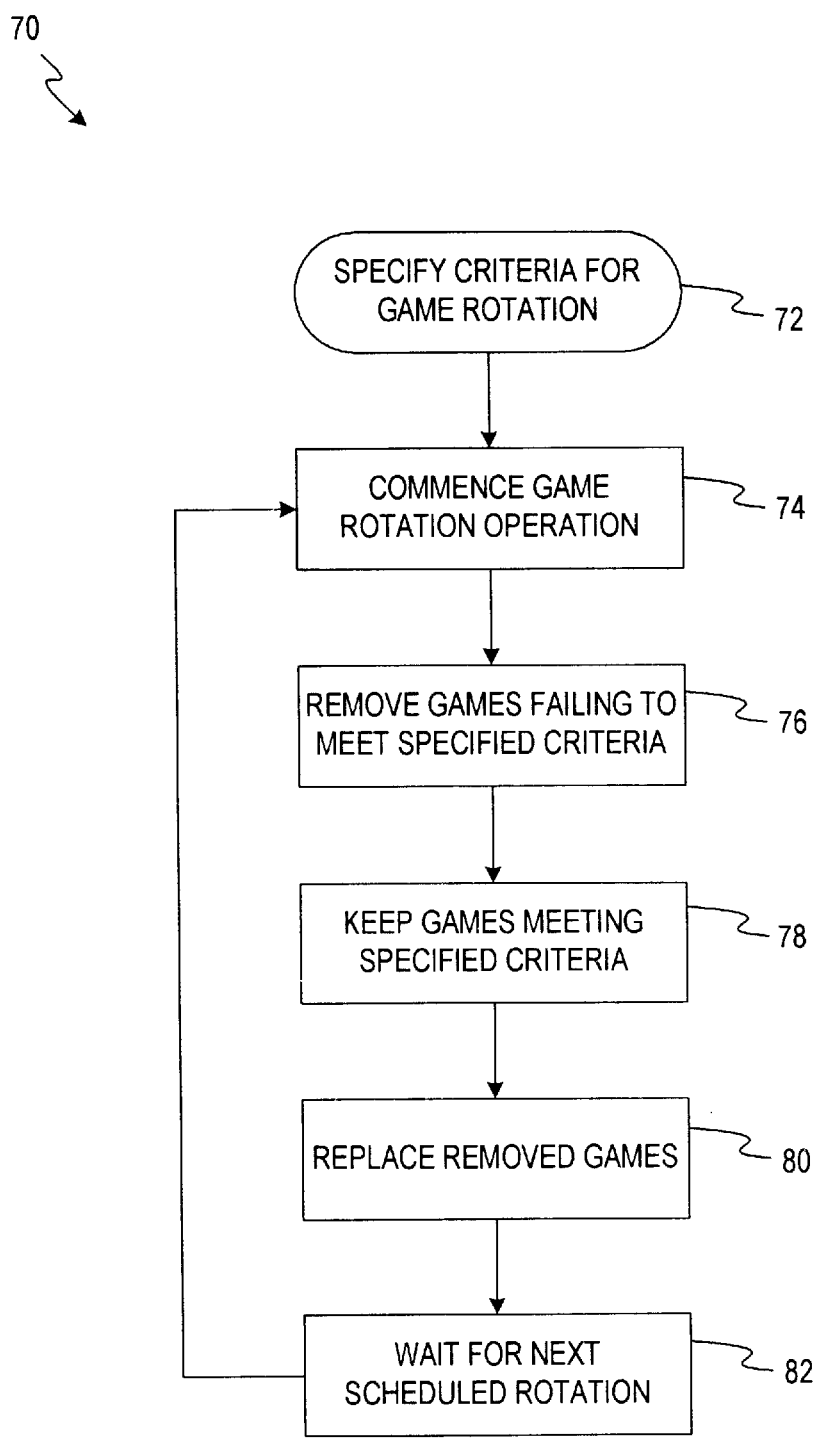
FIG. 5 is a flow chart of the game rotation system according to one embodiment of the present invention.

Referring now to FIG. 5, the operation of one embodiment of the game rotation system 70 will be described in greater detail. At step 72, the criteria for game rotation operation is specified by the user. This step 72 includes placing games in the "games in" and "games out" columns 32, 34 and specifying the frequency of game rotation as described in connection with FIG. 2. Further, whether a game title is rotated into or out of the game selection menu 60 on the performing of a game rotation is dependent on one or more criteria as determined by the operator of the multi-game machine. The intended purpose of the rotation influences the criteria specified for the game rotation. For example, the operator's intended purpose may be that new games are continually rotated into the game selection menu in order to generate as much exposure as possible for the new games. Alternatively, the operator may intend to continually rotate in games which have been found to produce the most games played and then rotate out those games once the instances of game play have declined with respect to those games. In alternative embodiments of the present invention, the operator can vary the number of games to be rotated out of the game selection screen. For example, in one embodiment, the game selection menu 60 contains ten games and the five least-played games are rotated off of the game selection menu 60 upon each execution of the game rotation operation. In another embodiment, the game selection screen contains five games and the three least-played games are rotated off of the game selection screen upon each execution of the game rotation operation. And in other alternative embodiments, the number of games rotated out of the game selection menu is dependent on the "rate" of game play. For example, those games which are played less than, for example, twenty times per day are rotated out of game selection screen. In such an embodiment, as little as zero games may be rotated from the game selection menu or as many as all of the games may be removed from the game selection menu.

At step 74, the game rotation operation is commenced once the operator has accepted the settings by depressing the "OK" button 40 on the set-up menu 30. The game rotation operation is also commenced at scheduled times (e.g., as specified by the operator with the rotation time selection element 38). Generally, upon the commencement of the game rotation operation some of the titles listed on the game selection menu 60 are removed and replaced by titles listed in the "games in" column 32 of the set-up menu 30 screen while other game titles remain in the game selection menu 60.

Upon commencement of the game rotation operation, the game titles currently being displayed on the game selection menu 60 are updated. At step 76, those games which fail to meet the specified criteria are removed from the game selection menu 60. For example, the three least played games are removed from the game selection menu 60 or any game producing less than ten plays is removed from the game selection menu 60 according to alternative embodiments of the present invention. At step 78, those games meeting the specified criteria are kept in the game selection menu 70. For example, the eight most popular games are kept in the game selection menu 60 according to an alternative embodiment of the present invention. And at step 80, the games which were removed at step 76 are replaced with different game titles. Finally, at step 82, the machine waits until the next scheduled game rotation at which time the process is repeated beginning with step 74.

As is apparent from the foregoing description, any one of a multitude of factors or criteria can be used to specify which games are rotated on to and off of the game selection menu 60 such as, for example, rate of game play per title, total number of plays per title, and so on. In other alternative embodiments, games are rotated without deference to instances of game play allowing a greater number of games to be displayed on the game selection menu which in turn results in more exposure of each of the game titles. In such an embodiment, the criteria for rotation off of the game selection menu is simply one or more games currently being displayed are rotated off of the screen thus making room for other non-displayed games.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A multiple game amusement game system comprising:
   a memory for storing a plurality of amusement games, each of the plurality of amusement games having a corresponding game title;
   a game selection menu for displaying at least two of the plurality of game titles to a player of the game system; and
   a processing unit for automatically removing one or more game titles from the game selection menu based on one or more criteria at the expiration of a predetermined amount of time, and for replacing the removed game titles with one or more game titles.

2. The system of claim 1 further comprising a game rotation set-up menu permitting an operator to select one or more of the plurality of games titles to exclude from display on the game selection menu.

3. The system of claim 2 wherein the set-up menu further includes a game rotation time selection element permitting the operator to specify the predetermined amount of time.

4. The system of claim 3 wherein the predetermined amount of time ranges between one week and sixteen weeks.

5. The system of claim 1 wherein the plurality of amusement games includes between two and two-hundred amusement games.

6. The system of claim 1 wherein the game selection menu has between two and ten game titles listed therein.

7. The system of claim 1 further comprising a game selection element permitting the player to select one of the at least two game titles displayed on the game selection menu.

8. The system of claim 1 wherein the one or more criteria includes instances of game play per game.

9. A method of rotating game titles displayed to a player of a multiple game amusement game machine, the method comprising:
   storing a plurality of amusement games in a memory of the amusement game machine, each of the plurality of amusement games having a corresponding game title;
   displaying one or more of the plurality of game titles in a game selection menu of the amusement game machine; and
   automatically updating the one or more game titles displayed in the game selection menu at the expiration of a predetermined amount of time based on one or more criteria.

10. The method of claim 9 further comprising:
    selecting a game title from the game selection menu; and
    playing the game corresponding to the selected game title.

11. The method of claim 9 further comprising specifying the predetermined amount of time.

12. The method of claim 11 wherein specifying the predetermined time period further comprises specifying the predetermined amount of time to be between one week and sixteen weeks.

13. The method of claim 9 wherein storing the plurality of amusement games in the memory further comprises storing between two amusement games and two hundred amusement games in the memory of the amusement game machine.

14. The method of claim 9 wherein displaying the one or more of the plurality of game titles in the game selection menu further comprises displaying between two game titles and ten game titles in the game selection menu.

15. The method of claim 9 wherein the one or more criteria includes instances of game play per game.

16. The method of claim 9 further comprising excluding one or more games from being displayed in the game selection menu.

17. The method of claim 9 wherein automatically updating the one or more game titles displayed in the game selection menu further comprises:
    removing one or more game titles from the game selection menu based on the one or more criteria at the expiration of the predetermined amount of time; and
    replacing the removed game titles with one or more game titles.

18. The method of claim 17 wherein removing the one or more game titles from the game selection menu further comprises removing one or more game titles corresponding to games that have been played less than a predetermined number of times over the predetermined amount of time.

19. A multiple game amusement game system comprising:
    a memory for storing a plurality of amusement games;
    a display for depicting a game selection menu including a plurality of game titles associated with certain ones of the games; and
    a processing unit for automatically performing a scheduled rotation of the game titles included in the game selection menu.

20. The system of claim 19 wherein the processing unit performs the scheduled rotation based on one or more predetermined criteria including instances of game play per game.

* * * * *